United States Patent

[11] 3,573,844

[72] Inventor Gerald Marvin Gardner
Stansted, Essex, England
[21] Appl. No. 740,138
[22] Filed June 26, 1968
[45] Patented Apr. 6, 1971
[73] Assignee International Standard Electric Corporation
New York, N.Y.
[32] Priority July 14, 1967
[33] Great Britain
[31] 32,457/67

[54] MAGNETIC RECORDING HEAD WITH A VARIABLE RELUCTANCE PATH
7 Claims, 12 Drawing Figs.

[52] U.S. Cl. .......... 346/74, 179/100.2, 340/174.1
[51] Int. Cl. .......... G01d 15/12, G11b 5/22, G11b 5/08
[50] Field of Search .......... 346/74 (MC); 179/100.2 (T), 100.2 (CB); 340/174.1 (F)

[56] References Cited
UNITED STATES PATENTS
3,108,281 10/1963 Uemura et al. .......... 346/74
3,391,254 7/1968 Honig .......... 179/100.2

*Primary Examiner*—Bernard Konick
*Assistant Examiner*—Gary M. Hoffman
*Attorneys*—C. Cornell Remsen, Jr., Walter J. Baum, Percy P. Lantzy, Philip M. Bolton, Isidore Togut and Charles L. Johnson, Jr.

ABSTRACT: A magnetic recording head having a single magnetic recording gap extending across the width of a recording medium which moves transversely thereto. A signal to be recorded, represented by pulses of alternating polarity and sequentially decreasing magnitudes, is applied to a signal winding which develops a magnetic flux. This flux follows a reluctance path which reduces from a maximum at one end of the head to a minimum at the other end of the head due to the combination of the placement of said winding at one end of said head, and the shape of said head, thereby causing successive portions in time of the signal to be recorded transversely in spatial sequence across the width of said medium.

Inventor
GERALD M. GARDNER
By Philip M. Bolton
Attorney

Inventor
GERALD M. GARDNER
By Philip M. Bolton
Attorney

Patented April 6, 1971 3,573,844

4 Sheets-Sheet 3

Inventor
GERALD M. GARDNER
By Philip M. Bolton
Attorney

Inventor
GERALD M. GARDNER
By
Attorney

MAGNETIC RECORDING HEAD WITH A VARIABLE RELUCTANCE PATH

BACKGROUND OF THE INVENTION

The invention relates to a magnetic recording head.

Magnetic recorders storing signals at high speed and/or at a high packing density frequently resort to the placement of successive signal elements transversely across the width of the tape or other storage medium, i.e. at right angles to the direction of tape motion. This has the advantage of reducing the actual tape velocity but requires either a multiplicity of heads with associated switching circuits or the mechanical transverse movement of a single head.

The undesirability of using a large number of heads with, inevitably, a complex signal distribution network, emphasizes the simplicity of feeding a single serial waveform into but one moving head. However, the mechanical limitations of such a device, particularly in a high speed magnetic recorder, are such as to limit the applications of this arrangement.

SUMMARY OF THE INVENTION

The invention provides a magnetic recording head comprising pole members which form a single magnetic recording gap and first means for applying due to an electrical signal applied thereto at each position of a magnetic recording medium, a magnetic field to said single magnetic recording gap, wherein the magnetic flux formed by said electrical signal in coupling means which couple said first means to said pole members follows a path having a reluctance which reduces gradually from a maximum value at one end of said single magnetic recording gap to a minimum value at the other end of said single magnetic recording gap, wherein and during the period of time said electrical signal, which comprises a series of pulses of one polarity and decreasing magnitude each one of which is followed by at least one other pulse of the opposite polarity and lesser in magnitude, is applied to said magnetic recording head, the alternate pulses of opposite polarity cause the strip of said magnetic recording medium situated immediately below said single magnetic recording gap to be magnetized alternately to a positive and to a negative saturated state, the decreasing magnitude of said series of pulses causing a series of magnetic images to be recorded in spatial sequence on said magnetic recording medium.

The foregoing and other features according to the invention will be better understood from the following description with reference to the accompanying drawings, in which.

DESCRIPTION OF THE PREFERRED EMBODIMENTS

Figure 1:
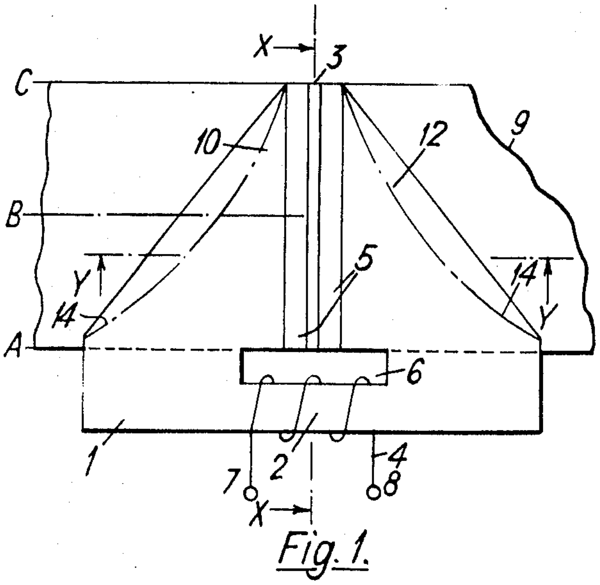
FIG. 1 shows a plan view of a diagrammatical representation of the magnetic recording head according to the invention.
Figure 2:
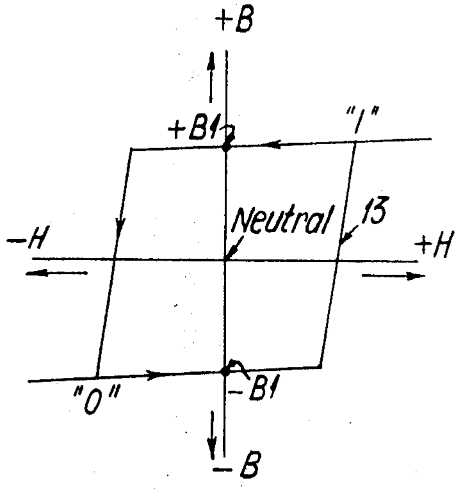
FIG. 2 shows a B-H curve for the material on which the magnetic recording head shown in the drawing according to FIG. 1 records.

Referring to FIG. 1, a plan view of a diagrammatical representation of the magnetic recording head according to the invention is shown and comprises a main body 1 having formed therein a single magnetic recording gap 3 which may in practice extend the full width of the recording medium 9, such as a magnetic tape or other magnetic storage medium having a rectangular hysteresis loop 13 as shown in the drawing according to FIG. 2, and an aperture 6 to provide a former 2 around which a signal winding 4 is wound which is terminated at each end thereof at the terminals 7 and 8.

Figure 3:
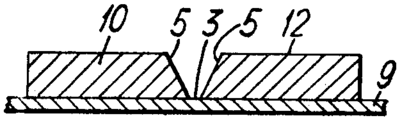
FIG. 3 shows a cross-sectioned front elevation of the magnetic recording head shown in the drawing according to FIG. 1 taken along the line Y–Y.

The pole pieces 10 and 12 on either side of the single magnetic recording gap 3 have chamfered edges 5 as shown in the drawing according to FIG. 3 and are in practice constructed of a 'soft' material, which is defined as a material which does not retain magnetism permanently but loses most of it when the magnetizing field is removed. However, they may be made of a high-coercivity magnetic material having a rectangular hysteresis loop 13 as shown in the drawing according to FIG. 2.

As can be seen from the drawing according to FIG. 1, due to the physical shape of the pole pieces 10 and 12 and the location of the signal winding 4 relative to the single magnetic recording gap 3, the magnetic flux formed by an electrical signal applied to the winding 4 will follow a path having a reluctance which reduces gradually from a maximum value at position C to a minimum value at position A.

If the signal winding 4 is energized with a gradually increasing current entering at the terminal 7, the pole piece 10 will become a magnetic North Pole and the pole piece 12 will become a magnetic South Pole. As the current increases, the magnetic field in the single magnetic recording gap 3 at position A will reach a value such as will completely saturate the surface of the recording medium 9 situated immediately below position A i.e., the surface of the recording medium 9 will be driven to state O on the rectangular hysteresis loop 13 shown in the drawing according to FIG. 2. As the applied drive current is further increased the surface of the recording medium 9 situated immediately below position B and then ultimately below position C will be similarly driven to state O on the rectangular hysteresis loop 13, thereby causing that strip of the surface of the recording medium 9 immediately below the single magnetic recording gap 3 i.e. between positions A and C to be driven to state "O". Similarly a current applied to the signal winding 4 in the reverse direction i.e. entering at the terminal 8 would cause that strip of the surface of the recording medium 9 immediately below the single magnetic recording gap 3 i.e. between position A and C to be driven to state 1 on the rectangular hysteresis loop 13 shown in the drawing according to FIG. 2.

If the recording medium is moved relative to the magnetic recording head shown in the drawings according to FIGS. 1 and 3, then on passing the single magnetic recording gap 3 the recording surface will be caused to be driven to the same remanent condition, provided the value of the electrical signal applied to the signal winding 4 is sufficiently high to effect this state, i.e. sufficiently high to cause the surface of the recording medium 9 between positions A and C to be driven to either state O or state 1. Under this condition there would be insufficient emergent flux from the surface of the recording medium for detection either by normal replay or magnetic inking techniques.

However, consider the situation where the entire surface of the recording medium has been driven or otherwise caused to be in state O and allowed to relax to the magnetized condition −B1 shown in the drawing according to FIG. 2. Then, on the application of a current of say 10 units to the signal winding 4 at a time $t_1$, this current being sufficiently high to drive the surface of the recording medium 9 situated immediately below the single magnetic recording gap 3 between positions A and B to state 1, the surface of the recording medium 9 between positions A and B will be driven to this state. Upon removal of the current of 10 units, the surface of the recording medium 9 situated immediately below the single magnetic recording gap 3 between positions A and B will relax to a magnetized condition +B1 whereas between positions B and C the surface of the recording medium 9 will remain undisturbed in the magnetized condition −B1. If at a time $t_2$ which is later than the time $t_1$ a current of 9 units, which is of reverse direction i.e. −9 units, is then applied to the signal winding 4, the single magnetic recording gap flux will cause the surface remanent state to be reversed along part of that strip of the recording medium 9 between positions A and B. Hence upon removal of this current of −9 units a short strip of the surface of the recording medium 9 near position B will be left in state 1 i.e. at the magnetized condition +B1.

Figure 5:
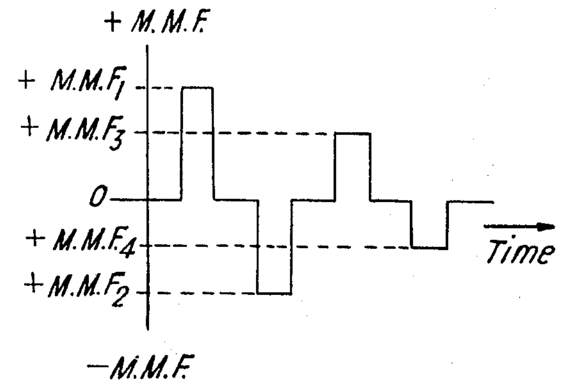
FIG. 5 shows the M.M.F. waveforms which are applied to the magnetic recording head in the drawings according to FIGS. 1 and 4.

This process may be repeated, normally starting at position C and then applying alternate current pulses of opposite sense and decreasing amplitude as shown in FIG. 5, thereby progressively leaving the desired magnetized pattern i.e. discrete elements of the recording surface in the state 1 on the surface of the recording medium between the positions A and C.

If the recording medium 9 is now moved past the single magnetic recording gap 3, it will be possible to cover its entire surface area with whatever pattern is required by appropriate control of the current waveform.

Thus in operation the current waveform, which comprises a series of current pulses, alternate pulses being of opposite polarity and the magnitude of each pulse being less than the magnitude of the preceding one by an amount which is equivalent to a length of recording surface immediately below the single magnetic recording gap 3 which is to be left in a magnetized state, is applied to the signal winding 4, and after a predetermined time a series of discrete elements are left in a magnetized state. At the instant the current waveform has caused the necessary discrete elements of the recording surface immediately below the single magnetic recording gap between positions A and C to be left in a magnetized state i.e. condition +B1, the recording medium 9 is moved by appropriate means such that the next length of the recording medium 9 onto which the next magnetic pattern is to be recorded is positioned beneath the single magnetic recording gap 3 of the magnetic recording head. When the recording medium 9 is relocated, the next current waveform is applied to the signal winding 4. Alternatively, the recording medium 9 could be moved continually instead of intermittently relative to the magnetic recording head according to the invention.

It may be that the two current pulses which define any one of the discrete magnetized elements on the surface of the recording medium 9 are displaced, relative to the current pulses associated with an adjacent preceding magnetized element, by a fairly long time interval; and the practical problems involved in the construction of an input signal circuit to generate and couple these current pulses to the signal winding 4 may be somewhat simplified if the input signal circuit were arranged to generate a series of pulses of one polarity and decreasing amplitude and to include the "write-in" pulse when required between any two of these pulses whose position coincided with the "write-in" position.

Figure 6:
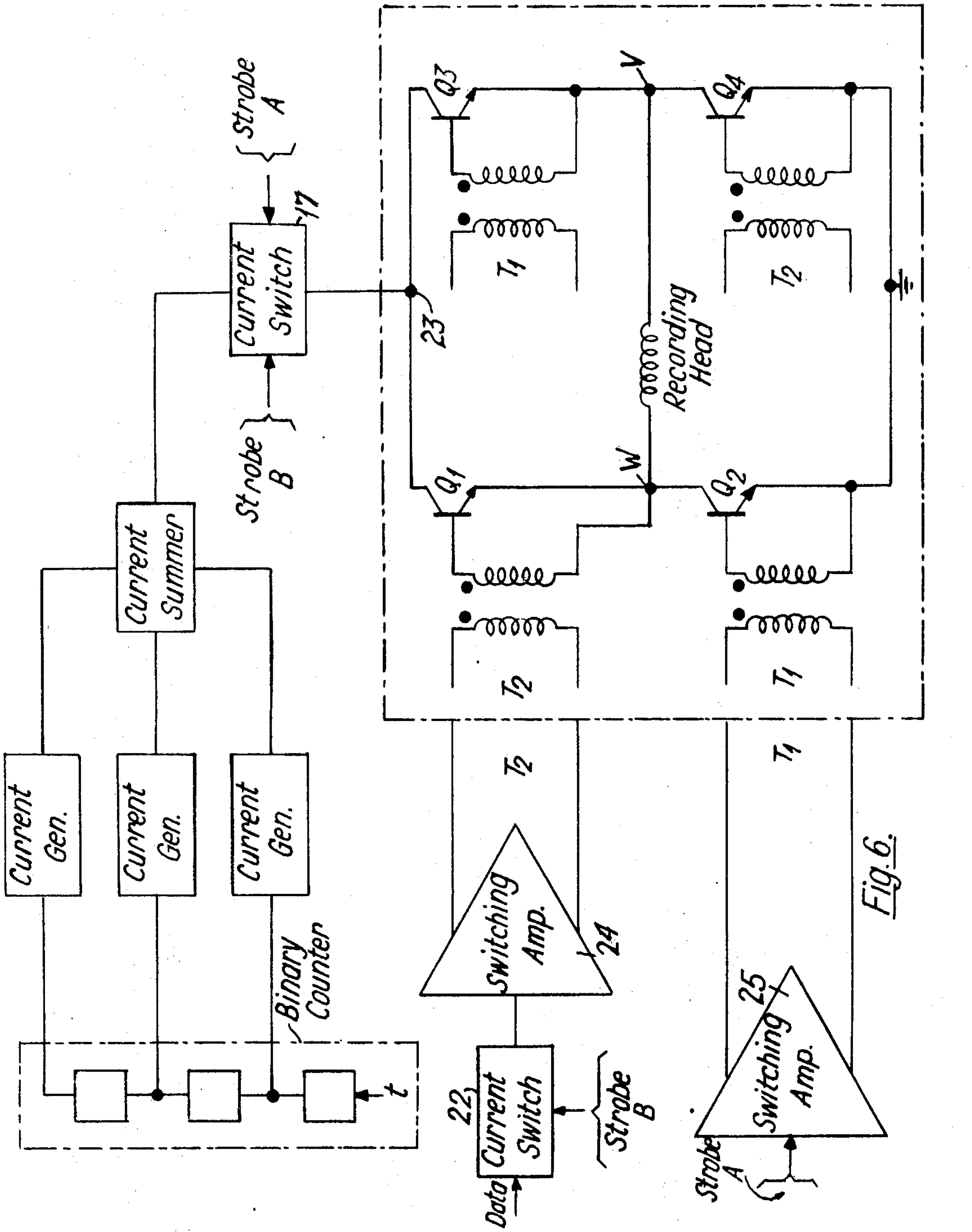
FIG. 6 is a diagram of a circuit which may be used to generate the M.M.F. waveforms shown in FIG. 5.

An example of a circuit which may be used to provide the waveform of FIG. 5 is shown in FIG. 6 and its operation is explained with reference to FIGS. 7*a* through 7*f*.

Figure 7:
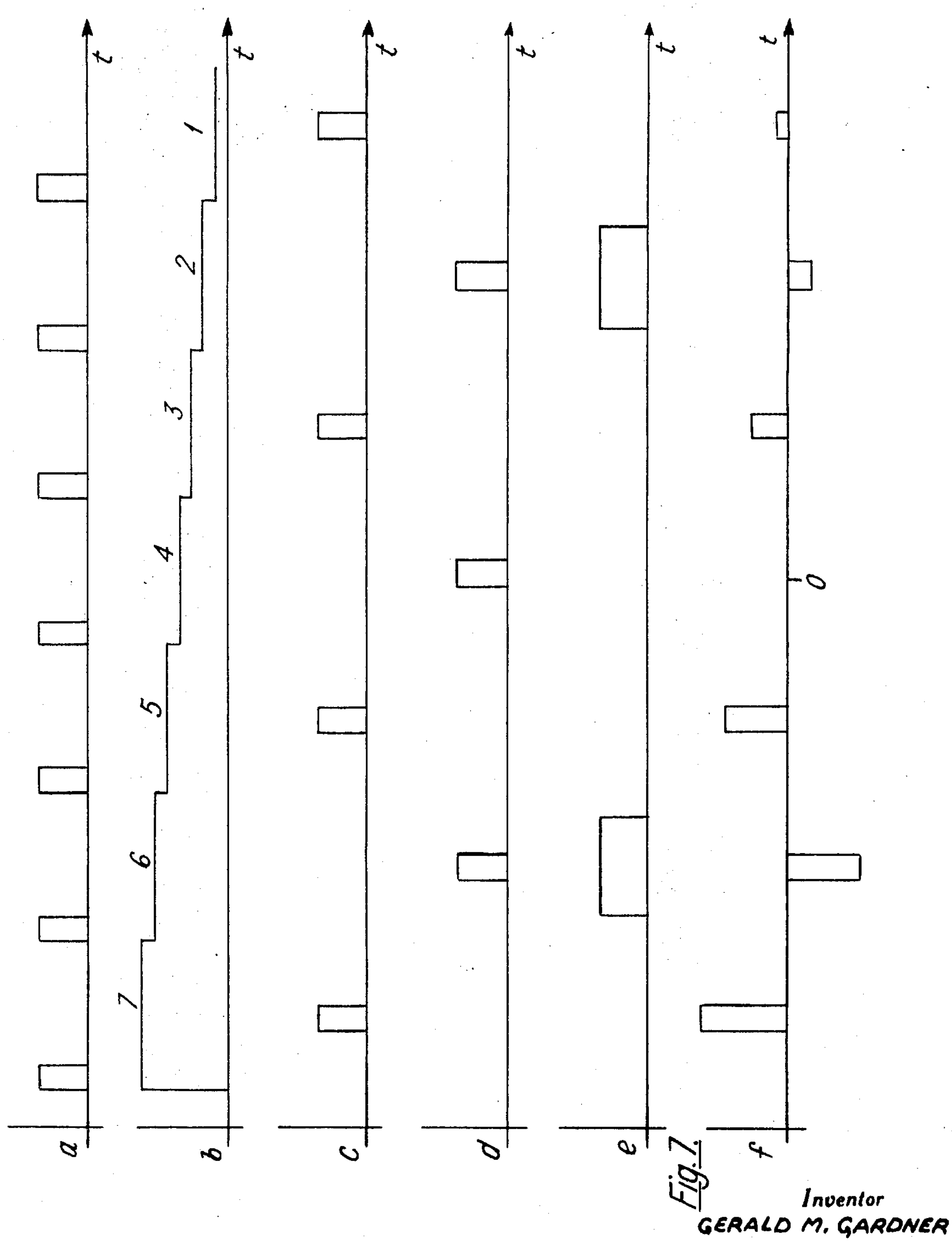
FIGS. 7*a*—7*f* are graphical representations of waveforms appearing at various points of the circuit of FIG. 6.

The timing pulses shown in FIG. 7*a* are provided to the binary counter shown in FIG. 6 which is conventional except for the outputs which are taken from the inverse side. This effectively causes the output to descend from seven to zero rather than the normal ascending count. The outputs of the stages of the binary counter are applied to current generators, and the outputs of the current generators are provided to a current summing device. A graphical representation of the current output from such a summing device versus time is shown in FIG. 7*b*. The waveform shown in FIG. 7*b* is then applied to a current switch 17 which is triggered by strobe pulses A or B as shown in FIGS. 7*c* and 7*d*, respectively.

Data in binary form, as shown in FIG. 7*e*, is provided to a current switch 22 which is activated by strobe B pulses, synchronizing the transmission of data with the pulse waveform being provided by the binary counter. The data pulses from the current switch 22 are transmitted to a switching amplifier 24 which amplifies the pulses, and which is connected to transformers $T_2$, thus providing input pulses which cause the recording of the data on the recording medium.

The input circuit for transformers $T_1$ as shown in FIG. 6 consists of strobe A pulses being provided to a switching amplifier 25 which amplifies the pulses, causing application of the erase signal to the recording medium.

As above stated, current pulses from the summing device are provided to the current switch 17 of FIG. 6 and a path for the current will be provided by the occurrence of either a strobe pulse A or strobe pulse B. For example, the initial pulse of a transmitted may produce a summing device output pulse of magnitude 7. In this example the occurrence of strobe pulse A causes the magnitude 7 pulse to be transmitted to the point designated 23 in the circuit of FIG. 6, and at the same time strobe pulse A causes a pulse to be provided to transformers $T_1$. The pulse input to transformers $T_1$ turns transistors $Q_2$ and $Q_3$ on, while transistors $Q_1$ and $Q_4$ are quiescent since no input is provided to transformer $T_2$, as strobe pulse B has not occurred. For this reason the collector-emitter circuits of transistors $Q_2$ and $Q_3$ are short circuits, and the current at point 23 will follow the path through $Q_3$, the coil representing the recording head from point V to point W and $Q_3$ to ground. Current flowing in this direction "erases" the recording medium, and a magnitude 7 pulse will erase the entire width of the recording medium.

Next appearing at the output of the current summing device of FIG. 6 is a current pulse of magnitude 6 (as indicated in FIG. 7*f*) which is transmitted to current switch 17, and a path for the pulse to point 23 is correspondingly provided by strobe pulse B. Strobe pulse B also provides a path for data appearing at the input of current switch 22, and a pulse is provided to transformers $T_2$. Upon the coincident arrival the current switch 22 of a data input pulse and a strobe B pulse the pulse to transformers $T_2$ will turn transistors $Q_1$ and $Q_4$ on, while the absence of strobe pulse A causes transistors $Q_2$ and $Q_3$ to be in a quiescent state, the collector-emitter circuits of transistors $Q_2$ and $Q_4$ therefore being short circuits. At this time, the current at point 23 will follow the path to ground through $Q_1$, the coil representing the recording head from point W to point V, and $Q_4$, to ground, causing magnetization of the recording medium across that portion of its width determined by the magnitude of the pulse at point 23 as provided by the binary counter.

If, however, at the time that strobe pulse B occurs no data pulse appears at the input of current switch 22, no pulse is provided to transformers $T_2$ and transistors $Q_1$ and $Q_4$ are quiescent. Transistors $Q_2$ and $Q_3$ are also quiescent since no pulse has been provided to transformers $T_1$ due to the absence of the strobe A pulse. Under these conditions a current pulse arriving at point 23 will be blocked, preventing the flow of current through the coil representing the recording head, and therefore preventing any magnetization of the recording medium due to the particular pulse which had been transmitted from the binary counter.

FIG. 7*e* illustrates the data signal applied to current switch 2 when it is desired to record the binary information 101.

FIG. 7*f* illustrates the resultant current flow through the coil of FIG. 6, representing the recording head, with a data input as illustrated in FIG. 7*e*. It will be noted that the positive, or erase pulses, travel from point Y to point W, while the negative, or record pulses, travel from point X to point W.

Figure 4:
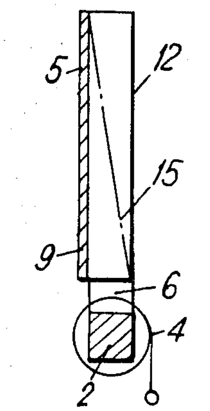
FIG. 4 shows a cross-sectioned side elevation of the magnetic recording head shown in the drawing according to FIG. 1 taken along the line X–X.

In order to control the relationship between the current amplitude and its limiting point of influence along the length of the single magnetic recording gap 3, it may be necessary to shape the pole pieces 10 and 12 to a specific contour, for example as shown by the chain dotted lines 14 shown in the drawing according to FIG. 1 or as shown by the chain dotted line 15 shown in the drawing according to FIG. 4 which shows a cross-sectional side elevation of the magnetic recording head shown in the drawing according to FIG. 1 taken along the line X–X. In either case the purpose of the contouring is to gradually reduce the cross-sectional area of each of the pole pieces 10 and 12 in accordance with a desired mathematical relationship thereby presenting to the magnetic flux formed by the electrical signal applied to the signal winding 4 an increasing reluctance path which will tend to control the relationship between the current amplitude and the length of the single magnetic recording gap 3 influenced thereby.

The magnetizing regions in the pole pieces 10 and 12 may be more sharply defined by use of laminations which would need to be shaped in accordance with the pole piece cross section shown in the drawing according to FIG. 3 and which would be spaced apart from one another by nonmagnetic spacers. Either pole piece or both may be laminated in this manner. Alternatively the magnetizing regions may be more clearly defined by cutting teeth in the gap edge of either or both of the pole pieces 10 and 12.

It is to be understood that the arrangement of the magnetic recording head according to the invention as shown in the drawings according to FIGS. 1, 3 and 4 is purely diagrammatic. The magnetic recording head may take many forms and be constructed in a variety of ways in order to achieve the desired result, the main criteria involved being that the magnetic flux formed by an electrical signal in coupling means which couple a signal winding assembly, to which the electrical signal is applied, to a single magnetic recording gap (which may extend the full width of a recording medium) should follow a path having a reluctance which reduces gradually from a maximum value at one end of the recording gap to a minimum value at the other end of the recording gap, and that the electrical signal applied at each position of the recording medium should comprise a series of current pulses of one polarity and decreasing amplitude, with these pulses having interspaced therebetween information pulses of opposite polarity and lesser magnitude.

In order to obtain the series of current pulses outlined in the preceding paragraphs it may be necessary to use a multiplicity of windings in place of the single winding 4 shown in the drawing according to FIGS. 1 and 4. The multiplicity of windings may take many forms, for example it may take the form of a binary type of winding arrangement i.e. of turns which increase in the manner of a binary code (1, 2, 4, 8, 16, 32 etc.). Then, by providing a few levels of current only and applying them to the multiple winding, the appropriate windings may be switched into circuit at the appropriate time to give the desired result.

A typical application of the magnetic recording head shown in the drawings according to FIGS. 1, 3 and 4 is in nonpercussive printing machines wherein the recording medium 9 could take the form of a drum which is rotated about its central axis; and as the surface of the drum moves past the single magnetic recording gap 3 of the magnetic recording head according to the invention the required information would be magnetically recorded thereon. The latent magnetic image is then developed by passing the printing drum through a powder applicator which contains a powder that is attractive to the electromagnetically formed pattern. The drum surface then comes in contact with a moving strip of paper which has the same linear velocity as the drum surface. A pressure roller presses the paper against the drum, and the powder pattern is transferred under pressure from the drum surface to the paper surface. It is the usual practice in such processes to include a thermal fixing agent, for example, resin or wax, in the powder formulation so that the pattern may be 'fixed' by the application of heat subsequent to pattern formation, therefore the paper strip after passing between the printing drum and the pressure roller is passed through heating means wherein the powder pattern is thermally bonded to the surface of the paper strip.

In a typical nonpercussive printing machine the printing drum is of the order of 8 inches wide and it may be required to record say 800 individual elements across the 8-inch width. The width of the pole pieces on the magnetic recording head and thereby the width of the recording gap would therefore need to be 8 inches. Alternatively, a plurality of the magnetic recording heads shown in the drawings could be utilized which would need to be coupled together in end-to-end relationship and separated from each other by nonferromagnetic spacers such that the overall length was of the order of 8 inches. For example, four magnetic recording heads, each one of which is approximately 2 inches long could be coupled together and separated from each other by nonferromagnetic spacers, the thickness of which must not exceed the minimum spacing between the individual magnetized elements. If it so happened that the position of any one of the magnetized elements coincided with any one of the joints between the individual magnetic recording heads then it would not be recorded; but by virtue of the definition which would in practice be of the order of 100 to 160 zones/inch its omission would not unduly blemish the magnetized pattern on the surface of the recording medium 9. Each of the individual heads which make up the magnetic recording head would be operated individually, as previously described, in sequence, with the electrical signals applied to the signal windings of each of the individual heads being synchronized such that they are switched into their respective magnetic recording head at the instant the preceding magnetic recording head has effected its recording action. The length of the recording gap i.e. the separation between the pole pieces might be say 0.01 inches or less. If at a given instant, only 0.01 inch of the head width were activated, the effective recording region would be limited to an area of 0.01×0.01 inch$^2$, and it would be possible to define 800 such regions across the width of the printing drum. Supposing that these regions were activated successively by the mechanism outlined in preceding paragraphs from position A to position A a sequence of 800 signal elements, fed in via the signal winding with the correct timing, would be recorded with correct spatial distribution from position A to position C right across the width of the printing drum for subsequent transfer to the paper strip.

The magnetic recording head according to the invention may be utilized in many other applications where it is required to magnetically record information contained in an electrical signal onto a recording medium, for example a magnetic tape as used in videotape or other types of magnetic recorders. In this application the magnetic pattern would be recovered by use of conventional replay heads.

It is to be understood that the foregoing description of specific examples of this invention is made by way of example only and is not to be considered as a limitation on its scope.

I claim:

1. A magnetic recording head arrangement for producing on a magnetizable recording medium moving adjacent and relative thereto a magnetic record of the elements of received intelligence signals, comprising:

a. a magnetic pole structure including coupling means for receiving a waveform and pole members disposed transversely of the recording medium which define adjacent to the medium a single magnetic recording gap therebetween of substantially constant width which extends across the width of the recording medium, said magnetic pole structure decreasing in cross section from one edge of the recording medium to the other according to a mathematical relationship to obtain a reluctance which varies correspondingly with said mathematical relationship in the magnetic circuit defined by said magnetic pole structure from a minimum at said one edge to a maximum at said other edge;

b. a pulse signal waveform coupled to said magnetic pole structure for causing the received signal elements to be recorded on discrete portions of predetermined width of the recording medium, said waveform including a series of first polarity pulses of successively decreasing magnitude and a series of second polarity pulses interspaced between said first polarity pulses, said second polarity pulses being representative of the received intelligence signals, whereby the magnitude difference between successive first polarity pulses corresponds with said varying reluctance to define said discrete portions of predetermined width; and c. means for providing said pulse signal waveform.

2. The magnetic recording head arrangement according to claim 1 wherein said pole members of said magnetic pole structure have a varying cross-sectional area according to said mathematical relationship and wherein said relationship is a linear function.

3. The magnetic recording head arrangement according to claim 1 wherein the cross-sectional area of said pole members vary according to an exponential function.

4. The magnetic recording head arrangement according to claim 1 wherein the cross-sectional area of said pole members vary according to an logarithmic function.

5. The magnetic recording head arrangement according to claim 1 wherein said means for providing said pulse signal waveform comprise:

a. first means for producing a repetitive stepped current waveform of progressively decreasing levels;
b. second means for establishing a current path through the recording head in either direction;
c. third means synchronized to said first means for providing to said second means at discrete intervals the waveform generated by said first means, and thereby periodically providing a path for current through the recording head in a first direction of magnitude corresponding to that of said stepped waveform;
d. fourth means, responsive to the received intelligence signals and synchronized to said third means for applying current pulses to said second means to provide a path for current through the recording head in the other direction of magnitude corresponding to that of said stepped waveform.

6. The magnetic recording head arrangement according to claim 5 wherein the means for applying the signal waveform to said magnetic pole structure include a coil wound on a former which is magnetically coupled to each of said pole members and which forms part of the magnetic circuit of the magnetic recording head.

7. The magnetic recording head arrangement according to claim 6 wherein said former and said pole members form an integral magnetic pole structure.